US008912773B2

(12) United States Patent
Parto et al.

(10) Patent No.: US 8,912,773 B2
(45) Date of Patent: Dec. 16, 2014

(54) SYNCHRONOUS BUCK CONVERTER INCLUDING MULTI-MODE CONTROL FOR LIGHT LOAD EFFICIENCY AND RELATED METHOD

(75) Inventors: Parviz Parto, Laguna Niguel, CA (US); Seungbeom Kevin Kim, Cerritos, CA (US); Amir M. Rahimi, Irvine, CA (US); Suresh Kariyadan, Irvine, CA (US)

(73) Assignee: International Rectifier Corporation, El Segundo, CA (US)

(*) Notice: Subject to any disclaimer, the term of this patent is extended or adjusted under 35 U.S.C. 154(b) by 580 days.

(21) Appl. No.: 13/111,638

(22) Filed: May 19, 2011

(65) Prior Publication Data

US 2012/0187928 A1  Jul. 26, 2012

Related U.S. Application Data

(60) Provisional application No. 61/461,698, filed on Jan. 20, 2011.

(51) Int. Cl.
*G05F 1/575* (2006.01)
*H02M 3/158* (2006.01)
*H02M 1/00* (2006.01)

(52) U.S. Cl.
CPC .............. *H02M 3/1588* (2013.01); *Y02B 70/16* (2013.01); *Y02B 70/1466* (2013.01); *H02M 2001/0032* (2013.01)
USPC .......................................... 323/271; 323/284

(58) Field of Classification Search
USPC ......................................... 323/271, 282, 284
See application file for complete search history.

(56) References Cited

U.S. PATENT DOCUMENTS

| | | | | |
|---|---|---|---|---|
| 5,773,966 A * | 6/1998 | Steigerwald | ................... | 323/284 |
| 6,366,070 B1 * | 4/2002 | Cooke et al. | ................... | 323/284 |
| 6,713,995 B2 * | 3/2004 | Chen | .............................. | 323/284 |
| 6,737,843 B2 * | 5/2004 | Kanakubo et al. | ............. | 323/282 |
| 7,057,380 B2 * | 6/2006 | Kuo et al. | ....................... | 323/284 |
| 7,102,340 B1 * | 9/2006 | Ferguson | ........................ | 323/284 |
| 7,173,403 B1 * | 2/2007 | Chen et al. | ..................... | 323/282 |
| 7,436,233 B2 * | 10/2008 | Yee et al. | ....................... | 327/172 |
| 7,474,086 B2 * | 1/2009 | Chen et al. | ..................... | 323/288 |
| 7,649,346 B2 * | 1/2010 | Sohma | ........................... | 323/283 |
| 7,986,135 B2 * | 7/2011 | Kenly et al. | ................... | 323/285 |
| 8,410,765 B2 * | 4/2013 | Hung et al. | ..................... | 323/282 |
| 2008/0224674 A1 * | 9/2008 | Hasegawa | ..................... | 323/271 |
| 2010/0295521 A1 * | 11/2010 | Odaohhara | .................... | 323/282 |
| 2011/0127977 A1 * | 6/2011 | Chang et al. | .................. | 323/282 |
| 2012/0187928 A1 * | 7/2012 | Parto et al. | ..................... | 323/271 |
| 2013/0241506 A1 * | 9/2013 | Yang et al. | .................... | 323/282 |

* cited by examiner

*Primary Examiner* — Jeffrey Sterrett
(74) *Attorney, Agent, or Firm* — Farjami & Farjami LLP

(57) ABSTRACT

According to one embodiment, a synchronous buck converter comprises a multi-mode control circuit for detecting a load condition of a variable load, an output stage driven by the multi-mode control circuit, wherein the variable load is coupled to the output stage, and a feedback circuit connected between the output stage and the multi-mode control circuit. The multi-mode control circuit is configured to adjust a current provided by the output stage to the variable load based on the load condition. In one embodiment, the multi-mode control circuit selectably uses one of at least a first control mode and a second control mode according to the load condition, wherein the first control mode is a pulse-width modulation (PWM) mode selected for switching efficiency when the load condition is heavy and the second control mode is an adaptive ON-time (AOT) mode selected for switching efficiency when the load condition is light.

20 Claims, 3 Drawing Sheets

SYNCHRONOUS BUCK CONVERTER INCLUDING MULTI-MODE CONTROL FOR LIGHT LOAD EFFICIENCY AND RELATED METHOD

RELATED APPLICATIONS

The present application claims the benefit of and priority to a provisional application entitled "Light Load Efficiency Improvement in Synchronous Buck Converters," Ser. No. 61/461,698 filed on Jan. 20, 2011. The disclosure in that provisional application is hereby incorporated fully by reference into the present application.

BACKGROUND OF THE INVENTION

1. Field of the Invention

The present invention is generally in the field of electrical circuits and systems. More specifically, the present invention is in the field of power conversion and regulation in electrical circuits and systems.

2. Background Art

Voltage regulators are used in a variety of electronic circuits and systems. Many integrated circuit (IC) applications, for instance, require conversion of a direct current (DC) input signal to a lower, or higher, DC output. For example, a buck converter may be implemented as a voltage regulator to convert a higher voltage DC input to a lower voltage DC output for use in low voltage applications in which relatively large output currents are required to support heavy load operation.

One conventional approach to implementing a voltage regulator, such as a synchronous buck converter, includes utilizing a pulse-width modulation (PWM) scheme to control the buck converter output stage. That approach typically results in good operating efficiency under heavy and medium load conditions. However, use of PWM to control buck converter output is associated with significant efficiency degradations as load conditions become light, due to switching loss, conduction loss, and/or transistor gate driving loss, for example.

The disadvantages associated with light load operation of a PWM controlled buck converter may have been tolerable when electronic devices were operated according to a classical binary ON/OFF paradigm. In that operating environment, an electronic device or system was completely shut down when not in use, e.g., it was turned OFF, and affirmatively turned ON only when needed, e.g., typically to operate at a medium or heavy load condition. As electronic devices and systems have become more pervasively integrated into almost all aspects of everyday life, however, the use of electronics in an always or mostly ON state in which load conditions may vary widely has grown increasingly common. Moreover, because many of those always or mostly ON electronic devices are likely to spend much of their operating time in a standby, or reduced power mode during which light load conditions prevail, light load efficiency has become increasingly important. Light load efficiency is also a significant concern for battery operated portable electronic devices, which are typically configured to revert to a power saving standby mode when not actively in use.

Thus, there is a need to overcome the drawbacks and deficiencies in the conventional art by a buck converter configured to be responsive to the demands of a variable load while providing high efficiency across a spectrum of operating conditions including light load conditions and heavy load conditions.

SUMMARY OF THE INVENTION

The present invention is directed to a synchronous buck converter including multi-mode control for light load efficiency and related method, substantially as shown in and/or described in connection with at least one of the figures, as set forth more completely in the claims.

DETAILED DESCRIPTION OF THE INVENTION

Figure 1:
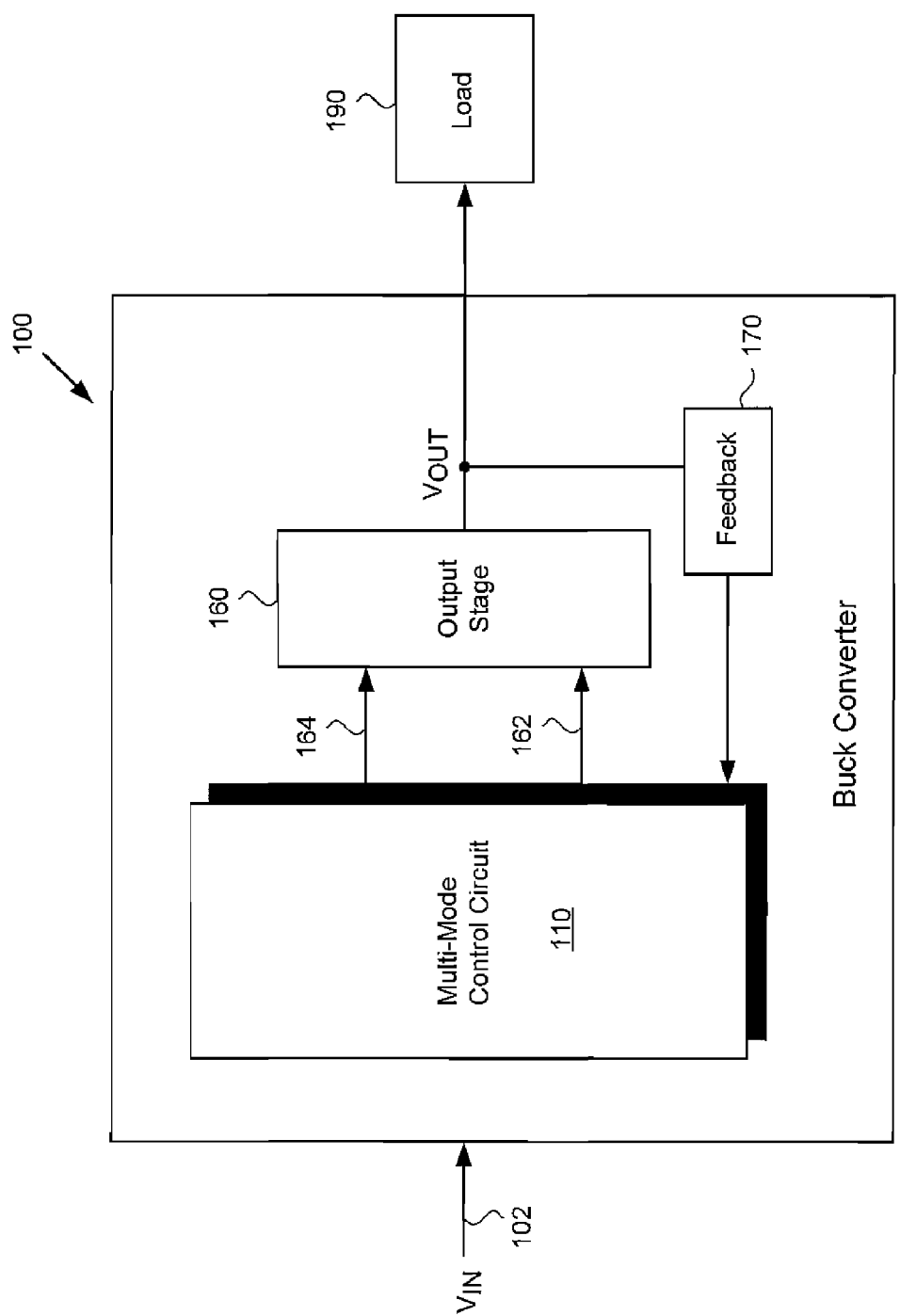
FIG. 1 shows a block diagram of a synchronous buck converter including a multi-mode control circuit, according to one embodiment of the present invention.

The present invention is directed to a synchronous buck converter including multi-mode control for light load efficiency and related method. Although the invention is described with respect to specific embodiments, the principles of the invention, as defined by the claims appended herein, can obviously be applied beyond the specifically described embodiments of the invention described herein. Moreover, in the description of the present invention, certain details have been left out in order to not obscure the inventive aspects of the invention. The details left out are within the knowledge of a person of ordinary skill in the art.

The drawings in the present application and their accompanying detailed description are directed to merely example embodiments of the invention. To maintain brevity, other embodiments of the invention, which use the principles of the present invention, are not specifically described in the present application and are not specifically illustrated by the present drawings. It should be borne in mind that, unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 is a block diagram showing buck converter 100 including multi-mode control circuit 110, according to one embodiment of the present invention. As shown in FIG. 1, buck converter 100, which may be a synchronous buck converter, also comprises output stage 160 receiving drive signals 162 and 164 from multi-mode control circuit 110, and feedback circuit 170. As further shown in FIG. 1, buck converter 100 is implemented so as to receive an input voltage $V_{IN}$ at input 102 and to provide a stepped down regulated voltage $V_{OUT}$ to load 190. According to one embodiment, buck converter 100 may be fabricated as part of an integrated circuit (IC) to provide voltage conversion and regulation for load 190, which may be implement as part of the same monolithic IC, for example. It is noted that, in the interest of conceptual clarity, only selected features of buck converter 100 are shown. Other features typically found in a buck converter, such as an output inductor, for example, are not expressly shown in FIG. 1, but are well known in the art.

As discussed above, in conventional implementations, a pulse-width modulation (PWM) scheme is typically used to control buck converter output because of the operational efficiency of that approach at medium and heavy load conditions.

However, the relative inefficiency of PWM control for light load conditions, due for example to losses, such as conduction losses, when little load current is required, renders the conventional single mode PWM approach undesirable in many buck converter applications. As further discussed above, the more prevalent use of electronic devices operating in an always or mostly ON state, coupled with the fact that such always or mostly ON electronic devices are likely to spend much of their operating time under light load conditions, have produced a need, unmet by conventional approaches, for providing efficient buck converter output control across a wide range of operating conditions, in response to the demands of a variable load.

Buck converter 100, shown in FIG. 1, overcomes the drawbacks and deficiencies of conventional voltage regulator circuits by including multi-mode control circuit 110. As will be explained more fully by reference to FIGS. 2 and 3, multi-mode control circuit 110 is configured to adjust a load current provided by output stage 160 to load 190. Load 190, which may be a variable load that periodically operates under light load, medium load, and heavy load conditions, for example, may correspond to an always or mostly ON load transitioning from active operation under varying medium and heavy load conditions, to a light load, standby state, in which little load current is required from output stage 160.

As will be further described below, according to one embodiment of the present invention, multi-mode control circuit 110 is configured to selectably provide drive signals 162 and 164 to output stage 160 using one of at least a first control mode and a second control mode, according to the load condition presented by load 190. For example, the first control mode may be selected for operating efficiency when the load condition is medium or heavy, and may comprise PWM mode, for example, or another constant frequency control mode. The second control mode may be selected for switching efficiency when the load condition is light, and may comprise an adaptive ON-time (AOT) mode, or other adjustable frequency control mode. Consequently, implementation of multi-mode control circuit 110 according to the present inventive principles advantageously enables efficient operation of buck converter 100 under substantially all load conditions.

Figure 2:
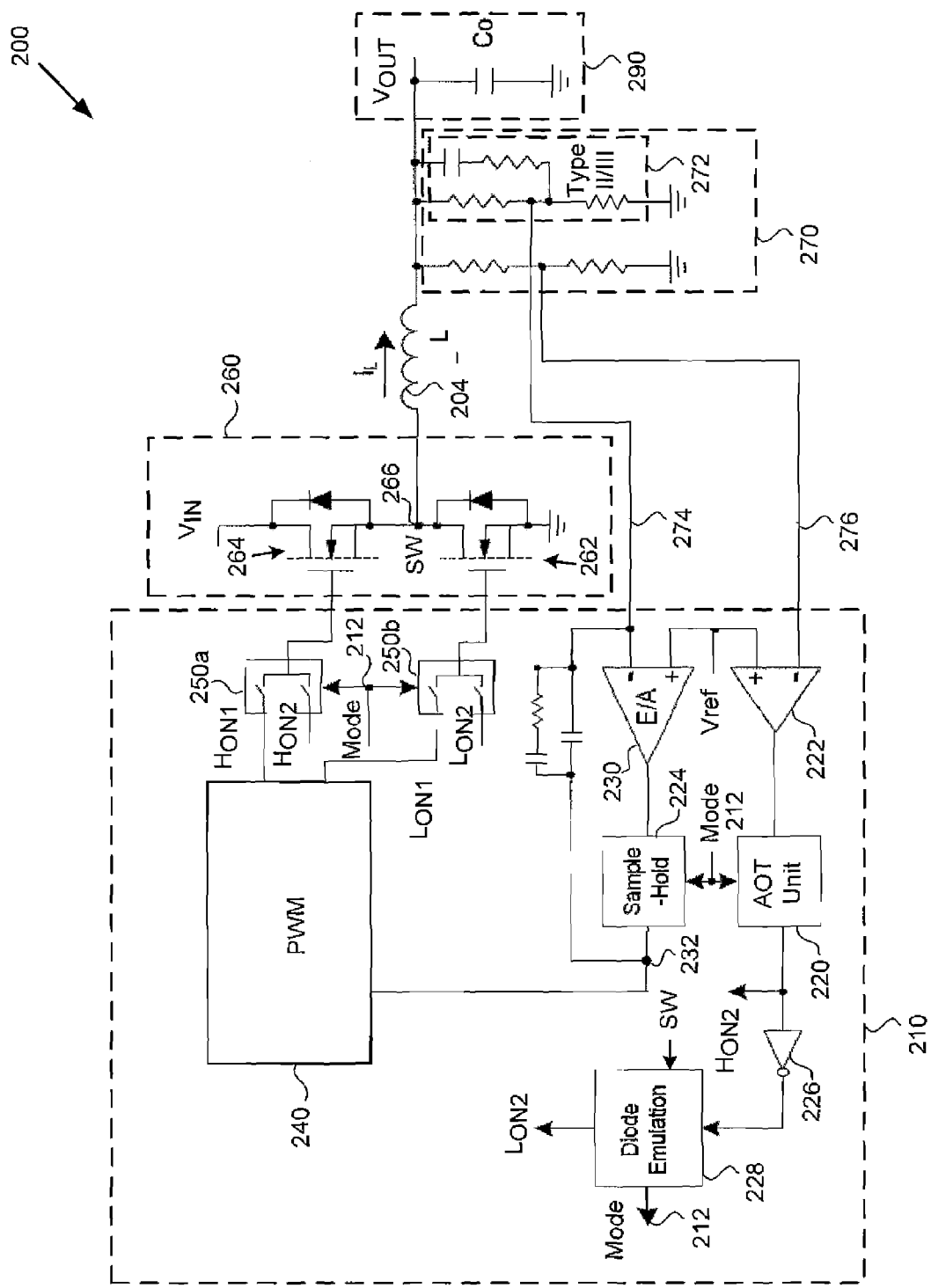
FIG. 2 shows a more detailed diagram of a synchronous buck converter including a multi-mode control circuit, according to one embodiment of the present invention.

FIG. 2 shows a more detailed diagram of synchronous buck converter 200 including multi-mode control circuit 210, according to one embodiment of the present invention. As shown in FIG. 2, in addition to multi-mode control circuit 210, synchronous buck converter 200 comprises output stage 260, output inductor 204 carrying inductor current $I_L$ and supplying output $V_{OUT}$ to load 290, and feedback circuit 270. Synchronous buck converter 200, multi-mode control circuit 210, output stage 260, feedback circuit 270, and load 290 correspond respectively to buck converter 100, multi-mode control circuit 110, output stage 160, feedback circuit 170, and load 190, in FIG. 1.

According to the embodiment of FIG. 2, feedback circuit 270 provides feedback path 274 coupling multi-mode control circuit 210 to feedback compensation block 272, which as shown by FIG. 2 may comprise a Type II or Type III feedback compensation block (hereinafter "Type II/III"). Feedback circuit 270 is also shown to couple multi-mode control circuit 210 through feedback path 276. In addition, output stage 260 of buck converter 200 comprises low-side switch 262 and high-side switch 264 arranged in series between input voltage $V_{IN}$ and ground in a half bridge configuration. Moreover, switching node 266 of output stage 260 is coupled to load 290 through output inductor 204. Output stage 260 may be seen to receive respective drive signals for high-side switch 264 and low-side switch 262 from multi-mode control circuit 210 through respective selective control outputs of output stage 260, shown as exemplary multiplexers 250a and 250b in the present embodiment.

The embodiment shown by FIG. 2 represents multi-mode control circuit 210 as a dual mode control circuit configured to selectably utilize one of a PWM control mode and an AOT control mode, but other embodiments of the present invention implementing more than two control modes are contemplated. According to the present specific embodiment, PWM control of output stage 260 can be provided through use of feedback circuit 270, Type II/III feedback path 274, error amplifier 230 and PWM logic block 240, while AOT control can be provided using feedback circuit 270, feedback path 276, comparator 222, AOT unit 220, sample-and-hold circuit 224, inverter 226, and diode emulation block 228. As also shown in FIG. 2, mode selection 212 may be an output of diode emulation block 228 and be provided as a control signal input to sample-and-hold circuit 224, AOT unit 220, and multiplexers 250a and 250b for selectably providing drive signals to respective high-side switch 264 and low-side switch 262 according to mode selection 212, which in turn is determined by the load condition corresponding to load 290. Also included in FIG. 2 are $V_{REF}$ providing reference voltage inputs to error amplifier 230 and comparator 222, COMP node 232, and respective high-side switch and low-side switch drive signals $H_{ON1}/H_{ON2}$ and $L_{ON1}/L_{ON2}$ corresponding to the respective PWM and AOT control modes.

The operation of synchronous buck converter 200 including multi-mode control circuit 210 will be described in greater detail in combination with FIG. 3, which presents flowchart 300 of a method for use in a synchronous buck converter, such as synchronous buck converter 200, in FIG. 2, according to one embodiment of the present invention. Certain details and features have been left out of flowchart 300, in FIG. 3, that are apparent to a person of ordinary skill in the art. For example, a step may comprise one or more substeps or may involve specialized equipment or materials, as known in the art. While steps 310 through 360 indicated in flowchart 300 are sufficient to describe one embodiment of the present invention, other embodiments of the invention may utilize steps different from those shown in flowchart 300, or may comprise more, or fewer, steps.

Figure 3:
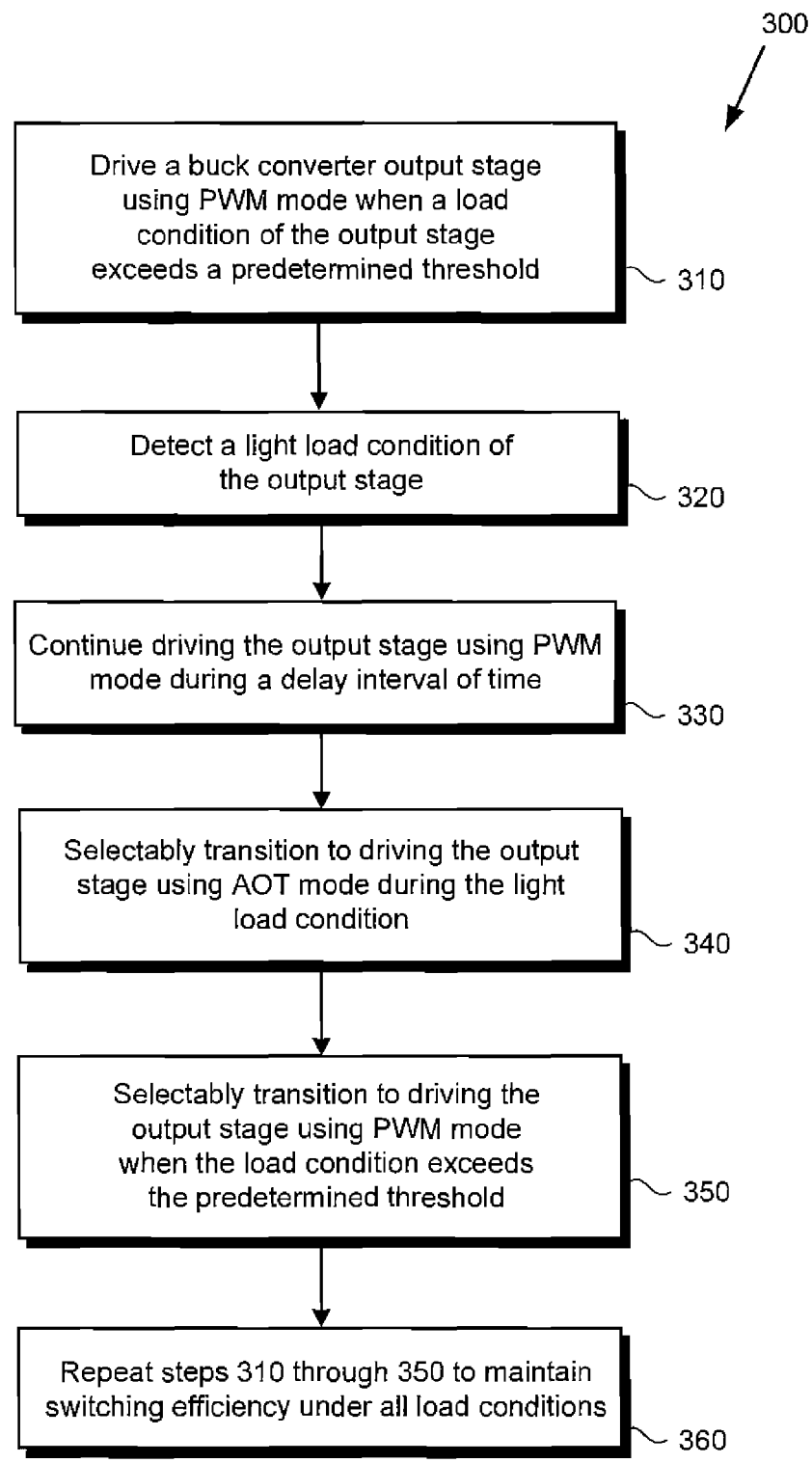
FIG. 3 is a flowchart of a method for use in a synchronous buck converter, according to one embodiment of the present invention.

Referring to step 310 in FIG. 3 and synchronous buck converter 200 in FIG. 2, step 310 of flowchart 300 comprises driving output stage 260 using a PWM control mode when a load condition of output stage 260 exceeds a predetermined threshold. Step 310 corresponds to a situation in which load 290 is actively operating and imposes a medium or heavy load condition on output stage 260. As previously discussed, when medium or heavy load currents are required through output inductor 204, controlling output stage 260 using a fixed frequency control mode such as PWM results in high switching efficiency by output stage 260, and enables high overall operating efficiency by synchronous buck converter 200.

Step 310 may be performed using Type II/III compensation block 272 of feedback circuit 270, Type II/III feedback path 274, error amplifier 230, and PWM logic block 240. Selection of a PWM mode, or more generally any control mode suitable for medium and heavy load conditions, by mode selection 212, results in PWM drive control signals $H_{ON1}$ and $L_{ON1}$ being routed to respective high-side switch 264 and low-side switch 262 by respective multiplexers 250a and 250b.

With respect to determination of the prevailing load condition, load condition sensing can be accomplished in a number of ways. In the embodiment of FIG. 2, one approach to sensing the prevailing load condition distinguishes a light load condition from medium and heavy load conditions on the basis of current flow through output inductor 204, such as by determining the direction of inductor current $I_L$ during a switching cycle. For example, by sensing the drain-to-source voltage of low-side switch 262, shown in FIG. 2 as a metal-oxide-semiconductor field-effect transistor (MOSFET), by, for example, sensing the voltage at switching node 266 when low-side switch 262 is ON, the direction of inductor current $I_L$ can be obtained. Again by way of example, if the voltage at switching node 266 is negative when low-side switch 262 is ON, the load condition exceeds the predetermined threshold and indicates that medium to heavy load conditions are present.

Continuing with step 320, in FIG. 3, with continued reference to synchronous buck converter 200, in FIG. 2, step 320 of flowchart 300 comprises detecting a light load condition of output stage 260. As explained previously when discussing step 310, in the present embodiment, detection of the load condition can correspond to determining the direction of inductor current $I_L$ during a switching cycle. As mentioned above, if the voltage at switching node 266 is negative when low-side switch 262 is ON, the load condition exceeds the predetermined threshold characterizing medium and heavy load conditions. Alternatively, if the voltage at switching node 266 rises to become positive when low-side switch 262 is ON, a light load condition is detected. According to the embodiment of FIG. 2, step 320 may be performed by diode emulation block 228, which is shown to receive the voltage at switching node 266 as an input and to provide mode selection 212 as an output.

Although in some embodiments of the present method, detection of a light load condition may trigger a substantially immediate transition to a control mode providing switching efficiency under light load conditions, such as an AOT control mode, there may be certain advantages to delaying such a transition. For example, referring to FIG. 2, during a delay period before transition to a second mode, output stage 260 may be controlled using PWM mode, so that the voltage at COMP node 232 ($V_{COMP}$) remains regulated by error amplifier 230. In that way, the overshoot on $V_{OUT}$ may be determined by the transient performance of the feedback closed loop provided by Type II/III compensation block 272 and Type II/III feedback path 274. Thus, according to the method embodied in FIG. 3, step 330 comprises continuing to drive output stage 260 using PWM mode for a delay interval of time after detection of the light load condition in step 320. Such a delay interval of time may be preset, for example, and correspond to a plurality of switching cycles, such as eight switching cycles, or may be a delay interval of time corresponding to more, or less, than eight switching cycles.

Continuing with step 340 of flowchart 300, step 340 comprises selectably transitioning to driving output stage 260 using AOT mode during the light load condition. Step 340 may be performed using error amplifier 230, comparator 222, sample-and-hold circuit 224, AOT unit 220, inverter 226, diode emulation block 228, and multiplexers 250a and 250b. For example, as explained above, diode emulation block 228 receives the voltage at switching node 266 as an input, and is thereby able to detect a light load condition and provide mode selection 212 specifying AOT mode as an output. In addition, diode emulation block 228 provides drive signal $L_{ON2}$ for light load control of low-side switch 262. As shown in FIG. 2, mode selection 212 is provided as a control input to multiplexers 250a and 250b. When AOT mode is selected, multiplexer 250a selectively provides drive control signal $H_{ON2}$ to high-side switch 264, while multiplexer 250b selectively provides light load drive control signal $L_{ON2}$ from diode emulation block 228 to low-side switch 262.

According to the embodiment shown in FIG. 2, sample-and-hold circuit 224 is configured to clamp $V_{COMP}$ at COMP node 232 at the transition to AOT mode and to maintain the clamped voltage throughout AOT mode operation. AOT unit 220 is configured to determine the ON-time for high-side switch 264 according to $V_{IN}$, $V_{OUT}$ as sensed by feedback provided from feedback circuit 270, and the switching frequency. As further shown in FIG. 2, AOT unit 220 provides light load drive signal $H_{ON2}$ as an output.

In AOT mode, the ON-time of high-side switch 264 may be determined according to load current and the inductance value of output inductor 204, as well as $V_{COMP}$, $V_{OUT}$, and the switching frequency. In circumstances in which the switching frequency can be modulated in a relatively large range above a minimum switching frequency requirement, and wherein $V_{IN}$ and $V_{OUT}$ are substantially constant, the ON-time of high side switch 264 can be maintained as a constant throughout a wide load range. However, in the extreme case, for example where switching frequency falls to less than or equal to approximately 25 kHz, the ON-time of high-side switch 264 can be further reduced so as to increase switching frequency, thereby avoiding operation at acoustic frequencies.

Moving to step 350 in FIG. 3, step 350 of flowchart 300 comprises selectably transitioning to driving output stage 260 using PWM mode when the load condition exceeds the predetermined threshold indicating that light load conditions no longer prevail. As previously explained with reference to step 310, one approach to sensing the transition to a light load condition from medium and heavy load conditions may include determining the direction of inductor current $I_L$ during a switching cycle, for example, by sensing the voltage at switching node 266 when low-side switch 262 is ON. However, once the transition to AOT mode to support light load operation has been made, that earlier approach can no longer be relied upon for sensing medium or heavy load conditions because, when in AOT, low-side switch 262 is turned OFF as soon as the inductor current $I_L$ becomes zero. Consequently, in AOT mode, the voltage at switching node 266 is always negative when the low-side-switch is on.

Nevertheless, other criteria can be identified for use as a sensing trigger for step 350. According to one embodiment, the mode used to control output stage 260 may transition from AOT mode to PWM mode, for example, when the voltage input provided to comparator 222 by feedback path 276 falls below some predetermined ratio of $V_{REF}$. For instance, according that embodiment, the triggering criteria for transition from light load to medium or heavy load operation may be met when that voltage is equal to approximately 97.5% of $V_{REF}$.

Alternatively, in one embodiment, the triggering criteria for transition from light load to medium or heavy load operation may be met when the voltage input provided to comparator 222 by feedback path 276 falls below $V_{REF}$ and remains less than $V_{REF}$ for two consecutive switching cycles. It is noted that when operating in AOT mode, the next switching cycle begins when the voltage input provided to comparator 222 by feedback path 276 is less than $V_{REF}$ after the inductor current $I_L$ has become zero. If the inductor current $I_L$ is positive, the control will wait until it becomes zero and then the next switching cycle begins. Thus, when the voltage input provided to comparator 222 by feedback path 276 falls below $V_{REF}$ and remains less than $V_{REF}$ for two consecutive switching cycles, it means that the inductor current $I_L$ becomes zero after the voltage input provided to comparator 222 by feedback path 276 falls to less than $V_{REF}$.

Unlike the transition to light load operation using AOT mode, the transition in step 350 to medium and heavy load operation using PWM as a drive control mode may not be associated with a delay interval of time after the triggering criteria has been met. According to the present embodiment, for example, it is contemplated that the transition from light load operation to medium/heavy load operation will occur substantially immediately upon satisfaction of the sensing criteria utilized as the trigger for step 350. For example, in order to minimize the undershoot of $V_{OUT}$ as load conditions increase, the voltage at COMP node 232 can be quickly unclamped so as to be controlled anew using Type II/III feedback path 274 and error amplifier 230.

As indicated in step 360 of flowchart 300, steps 310 through 350 may be repeated as necessary to maintain switching efficiency under substantially all load conditions. As may be apparent from the foregoing, various embodiments of the present invention provide numerous advantages over conventionally configured voltage regulators. For example, by implementing a constant frequency control mode at medium and heavy load conditions, embodiments of the present invention ensure efficient operation and stable performance under those load demands. In addition, by selectably transitioning to an adaptive ON-time mode when light load conditions are sensed, embodiments of the present invention advantageously avoid the losses, such as conduction losses, which so substantially degrade the light load efficiency of conventional voltage regulators.

From the above description of the invention it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. The described embodiments are to be considered in all respects as illustrative and not restrictive. It should also be understood that the invention is not limited to the particular embodiments described herein, but is capable of many rearrangements, modifications, and substitutions without departing from the scope of the invention.

The invention claimed is:

1. A synchronous buck converter comprising:
    a multi-mode control circuit for detecting a load condition of a variable load;
    an output stage driven by said multi-mode control circuit;
    said variable load coupled to said output stage;
    said multi-mode control circuit including a first control circuitry for driving said output stage using a first control mode and a second control circuitry different from said first control circuitry for driving said output stage using it second control mode;
    a feedback circuit connected between said output stage and said multi-mode control circuit, said feedback circuit configured to provide a first feedback signal to said first control circuitry using a first feedback path, and to provide a second feedback signal to said second control circuitry using a second feedback path;
    wherein said multi-mode control circuit adjusts a current provided by said output stage to said variable load based on said load condition.

2. The synchronous buck converter of claim 1, wherein said multi-mode control circuit is configured to selectably provide a drive signal to said output stage using one of said first control mode and said second control mode according to said load condition.

3. The synchronous buck converter of claim 1, wherein said multi-mode control circuit is configured to selectably provide a drive signal to said output stage using one of at least said first control mode and said second control mode according to said load condition, and wherein said first control mode is selected for switching efficiency when said load condition is heavy and said second control mode is selected for switching efficiency when said load condition is light.

4. The synchronous buck converter of claim 1, wherein one control mode selectably used by said multi-mode control circuit to drive said output stage comprises an adaptive ON-time (AOT) mode.

5. The synchronous buck converter of claim 1, wherein one control mode selectably used by said multi-mode control circuit to drive said output stage comprises an AOT mode; and wherein an ON-time of said AOT mode is determined according to one of said first and second feedback signals received from said feedback circuit.

6. The synchronous buck converter of claim 1, wherein said multi-mode control circuit is further configured to increase a switching frequency of said output stage if said switching frequency is less than or equal to approximately 25 kHz.

7. The synchronous buck converter of claim 1, wherein one control mode selectably used by said multi-mode control circuit to drive said output stage comprises a pulse-width modulation (PWM) mode.

8. The synchronous buck converter of claim 1, wherein said multi-mode control circuit is configured to selectably provide a drive signal to said output stage using one of at least said first control mode and said second control mode according to said load condition, wherein said first control mode is selected for switching efficiency when said load condition is heavy and said second control mode is selected for switching efficiency when said load condition is light, said multi-mode control circuit further configured to delay transition from said first control mode to said second control mode for a delay interval after detecting that said load condition is light.

9. The synchronous buck converter of claim 1, wherein said multi-mode control circuit comprises a first selective control output coupled to a high-side switch of said output stage and a second selective control output coupled to a low-Side switch of said output stage.

10. The synchronous buck converter of claim 1, wherein said multi-mode control circuit comprises a first selective control output coupled to a high-side switch of said output stage and a second selective control output coupled to a low-side switch of said output stage, and wherein said first and second selective control outputs comprise respective first and second multiplexers.

11. A method for use in a synchronous buck converter, said method comprising:
    driving an output stage of said synchronous buck converter by a multi-mode control circuit including a first control circuitry for driving said output stage using a first control mode and a second control circuitry different from said first control circuitry for driving said output stage using a second control mode;
    detecting by said multi-mode control circuit a load condition of a variable load coupled to said output stage;
    providing feedback from said output stage to said multi-mode control circuit by a feedback circuit of said synchronous buck converter, said feedback circuit configured to provide a first feedback signal to said first control circuitry using a first feedback path, and to provide a second feedback signal to said second control circuitry using a second feedback path;

adjusting by said multi-mode control circuit a current provided by said output stage to said variable load based on said load condition.

12. The method of claim 11, wherein driving said output stage of said synchronous buck converter by said multi-mode control circuit comprises selectably providing a drive signal to said output stage using one of said first control mode and said second control mode according to said load condition.

13. The method of claim 11, wherein driving said output stage of said synchronous buck converter by said multi-mode control circuit comprises selectably providing a drive signal to said output stage using one of at least said first control mode and said second control mode according to said load condition, and wherein said first control mode is selected for switching efficiency when said load condition is heavy and said second control mode is selected for switching efficiency when said load condition is light.

14. The method of claim 11, wherein one control mode selectably used by said multi-mode control circuit to drive said output stage comprises an adaptive ON-time (AOT) mode.

15. The method of claim 11, wherein one control mode selectably used by said multi-mode control circuit to drive said output stage comprises an AOT mode, and wherein an ON-time of said AOT mode is determined according to one of said first and second feedback signals received from said feedback circuit.

16. The method of claim 11, further comprising increasing by said multi-mode control circuit a switching frequency of said output stage if said switching frequency is less than or equal to approximately 25 kHz.

17. The method of claim 11, wherein one control mode selectably used by said multi-mode control circuit to drive said output stage comprises a pulse-width modulation (PWM) mode.

18. The method of claim 11, wherein driving said output stage of said synchronous buck converter by said multi-mode control circuit comprises selectably providing a drive signal to said output stage using one of at least said first control mode and said second control mode according to said load condition, wherein said first control mode is selected for switching efficiency when said load condition is heavy and said second control mode is selected for switching efficiency when said load condition is light, said method further comprising delaying a transition from said first control mode to said second control mode for a delay interval after detecting that said load condition is light.

19. The method of claim 11, wherein said multi-mode control circuit comprises a first selective control output coupled to a high-side switch of said output stage and a second selective control output coupled to a low-side switch of said output stage.

20. The method of claim 11, wherein said multi-mode control circuit comprises a first selective control output coupled to a high-side switch of said output stage and a second selective control output coupled to a low-side switch of said output stage, and wherein said first and second selective control outputs comprise respective first and second multiplexers.

* * * * *